(12) United States Patent
Lee

(10) Patent No.: US 8,324,752 B2
(45) Date of Patent: Dec. 4, 2012

(54) WATER WAVE POWER PLANT SYSTEM

(76) Inventor: Kye Young Lee, Los Angeles, CA (US)

( * ) Notice: Subject to any disclaimer, the term of this patent is extended or adjusted under 35 U.S.C. 154(b) by 212 days.

(21) Appl. No.: 12/648,643

(22) Filed: Dec. 29, 2009

(65) Prior Publication Data
US 2011/0156395 A1   Jun. 30, 2011

(51) Int. Cl.
*F03B 13/10* (2006.01)
*F03B 13/12* (2006.01)
*H02P 9/04* (2006.01)

(52) U.S. Cl. .......................... 290/53; 290/42

(58) Field of Classification Search .............. 290/53, 290/54, 42, 43; 417/335
See application file for complete search history.

(56) References Cited

U.S. PATENT DOCUMENTS

| | | | | |
|---|---|---|---|---|
| 3,911,287 | A * | 10/1975 | Neville | 290/53 |
| 4,249,085 | A * | 2/1981 | Kertzman | 290/53 |
| 7,012,341 | B2 * | 3/2006 | Matsubara | 290/43 |
| 7,687,931 | B2 * | 3/2010 | Gasendo | 290/54 |
| 7,759,814 | B2 * | 7/2010 | Oigarden | 290/53 |
| 7,791,213 | B2 * | 9/2010 | Patterson | 290/53 |

* cited by examiner

*Primary Examiner* — Hae Moon Hyeon
(74) *Attorney, Agent, or Firm* — John K. Park; Park Law Firm

(57) ABSTRACT

A water wave power plant system includes a first guide rail, a first clockwise freewheel, a first counterclockwise freewheel, a first buoy queued through the through-hole by the first guide rail, first right and left roller, a first chain belt having engaging the first clockwise freewheel, the first counterclockwise freewheel, the first right roller, and the first left roller on the first plane, and corresponding second set of equivalent elements to tap the water wave energy in an opposite direction. The first buoy and the second buoy are disposed on the first chain belt and the second chain belt, such that the first and the second buoy move oppositely from each other by a water wave.

17 Claims, 4 Drawing Sheets

WATER WAVE POWER PLANT SYSTEM

BACKGROUND OF THE INVENTION

The present invention relates to a water wave power plant system. More particularly, this invention relates to a water wave power plant system, which taps energy from water wave efficiently.

It is well known that over 70 percent of the surface of Earth is ocean. The ocean meets the landmass along almost endless coastline, and dumps vast energy of wave right there.

Therefore, it would be wonderful if we can secure some of the wave energy for needs of human.

Accordingly, a need for a water wave power plant system has been present for a long time considering the expansive demands in the everyday life of energy. This invention is directed to solve these problems and satisfy the long-felt need.

SUMMARY OF THE INVENTION

The present invention contrives to solve the disadvantages of the prior art.

An object of the invention is to provide a water wave power plant system.

Another object of the invention is to provide a water wave power plant system, which taps cheap energy from vertical waves.

Still another object of the invention is to provide a water wave power plant system, which is easy to install or expand.

An aspect of the invention provides water wave power plant system.

The water wave power plant system comprises:
a first guide rail extending vertically;
a first clockwise freewheel disposed at a top position;
a first counterclockwise freewheel disposed at the top position and on a first plane same as the first clockwise freewheel;
a first buoy having a through-hole, wherein the first buoy is queued through the through-hole by the first guide rail and movement of the first buoy is restricted to be along the first guide rail;
a first right roller aligned vertically with the first clockwise freewheel and disposed at a bottom position;
a first left roller aligned vertically with the first counterclockwise freewheel and disposed at the bottom position;
a first chain belt having a first end connected to a top portion of the first buoy and a second end connected to a bottom portion of the first buoy, wherein the first chain belt engages the first clockwise freewheel, the first counterclockwise freewheel, the first right roller, and the first left roller on the first plane;
a second guide rail extending vertically;
a second clockwise freewheel disposed at the top position;
a second counterclockwise freewheel disposed at the top position and on a second plane same as the second clockwise freewheel;
a second buoy having a through-hole, wherein the second buoy is queued through the through-hole by the second guide rail and movement of the second buoy is restricted to be along the second guide rail;
a second right roller aligned vertically with the second clockwise freewheel and disposed at the bottom position;
a second left roller aligned vertically with the second counterclockwise freewheel and disposed at the bottom position;
a second chain belt having a first end connected to a top portion of the second buoy and a second end connected to a bottom portion of the second buoy, wherein the second chain belt engages the second clockwise freewheel, the second counterclockwise freewheel, the second right roller, and the second left roller on the second plane;
a clockwise shaft engaging the first and second clockwise freewheels;
a counterclockwise shaft engaging the first and second counterclockwise freewheels;
a first generator engaging the clockwise shaft; and
a second generator engaging the counterclockwise shaft.

The first buoy and the second buoy are disposed on the first chain belt and the second chain belt, such that the first and the second buoy move oppositely from each other by a water wave.

Each of the first guide rail and the second guide rail may have a rectangular cross-section, such that the corresponding buoy is guided along without rotating around the guide rail.

The clockwise freewheels may be configured to engage the corresponding clockwise shaft for a clockwise rotation, and the counterclockwise freewheels may be configured to engage the corresponding counterclockwise shaft for a counterclockwise rotation.

The clockwise freewheels may be configured to disengage the corresponding clockwise shaft for a counterclockwise rotation, and the counterclockwise freewheels may be configured to disengage the corresponding counterclockwise shaft for a clockwise rotation.

Each of the freewheels may comprise a ratchet device.

Each of the freewheels may comprise a plurality of spring-loaded steel rollers inside a driven cylinder.

Each of the first and second buoys may comprise a container for keeping water of a predetermined amount inside.

The predetermined amount may be determined to make the buoy operate in a desired way.

The water wave power plant system may further comprise a stopcock for blocking an opening to the container.

Each of the first guide rail and the second guide rail may have an angular cross-section, such that the corresponding buoy is guided along without rotating around the guide rail.

The angular cross-section may comprise a triangle, a pentagon, a hexagon, and a quadrangle.

The water wave power plant system may further comprise a supporting frame for anchoring the guide rails, the shafts, and the right and left rollers.

The water wave power plant system may further comprise a plurality of bearings for allowing the shafts rotate freely while constrained against the supporting frame.

The water wave power plant system may further comprise a platform fixed to a floor of ocean for installing the supporting frame.

The water wave power plant system may further comprise a floating platform for installing the supporting frame.

The floating platform may comprise a barge, which comprises a water container with a stopcock. Like the buoy, the water container of the barge can be loaded with water to optimize the condition for the operation of the system.

In certain embodiments of the invention, the system may include more buoys and associated other elements for expanding the structure to tap more of the wave energy.

The advantages of the present invention are: (1) the water wave power plant system has a simple structure to manufacture, install, and maintain; and (2) the water wave power plant system can be expanded to a larger system conveniently.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

Figure 1:
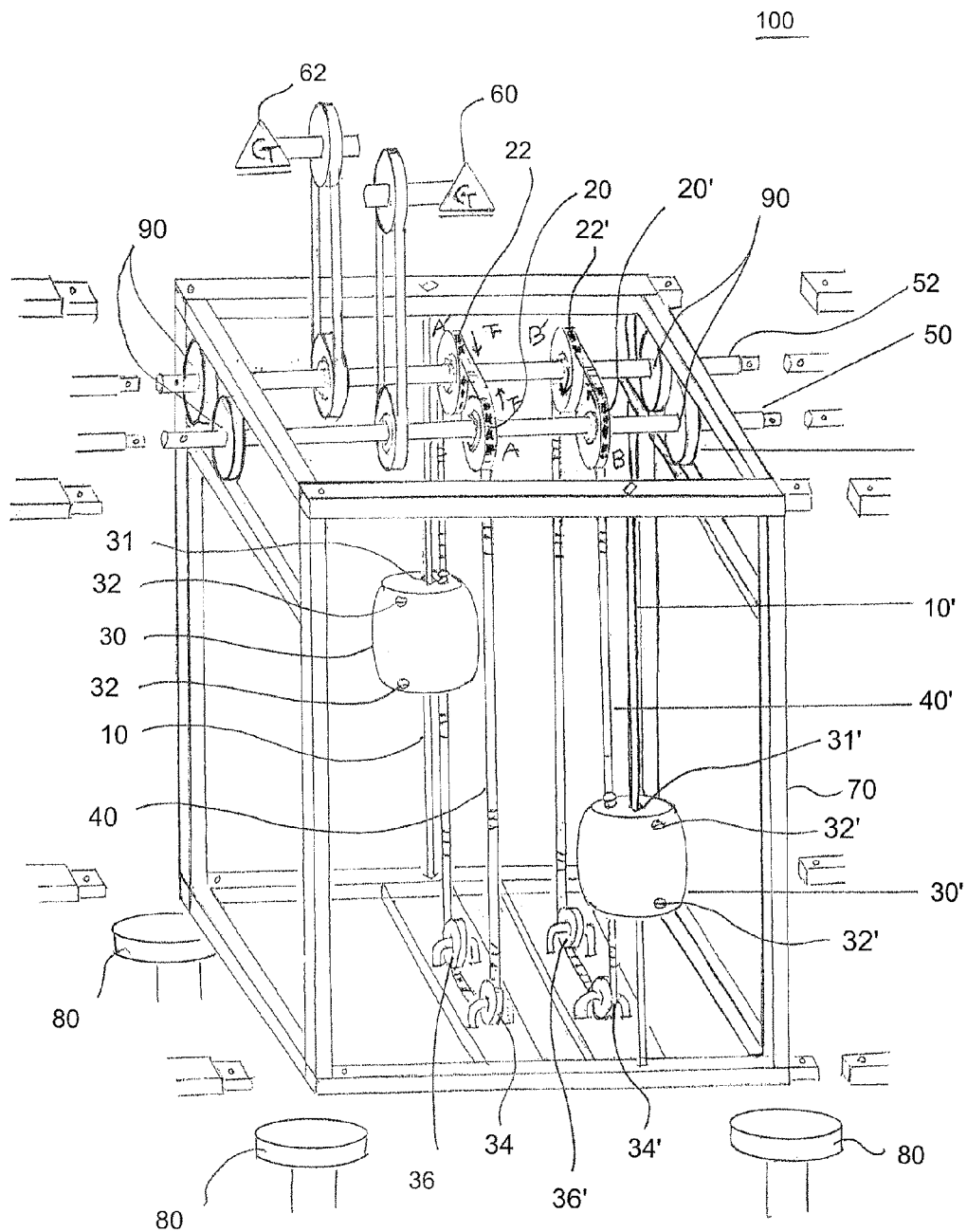
FIG. 1 is a perspective view showing a water wave power plant system according to an embodiment of the present invention.
Figure 2:
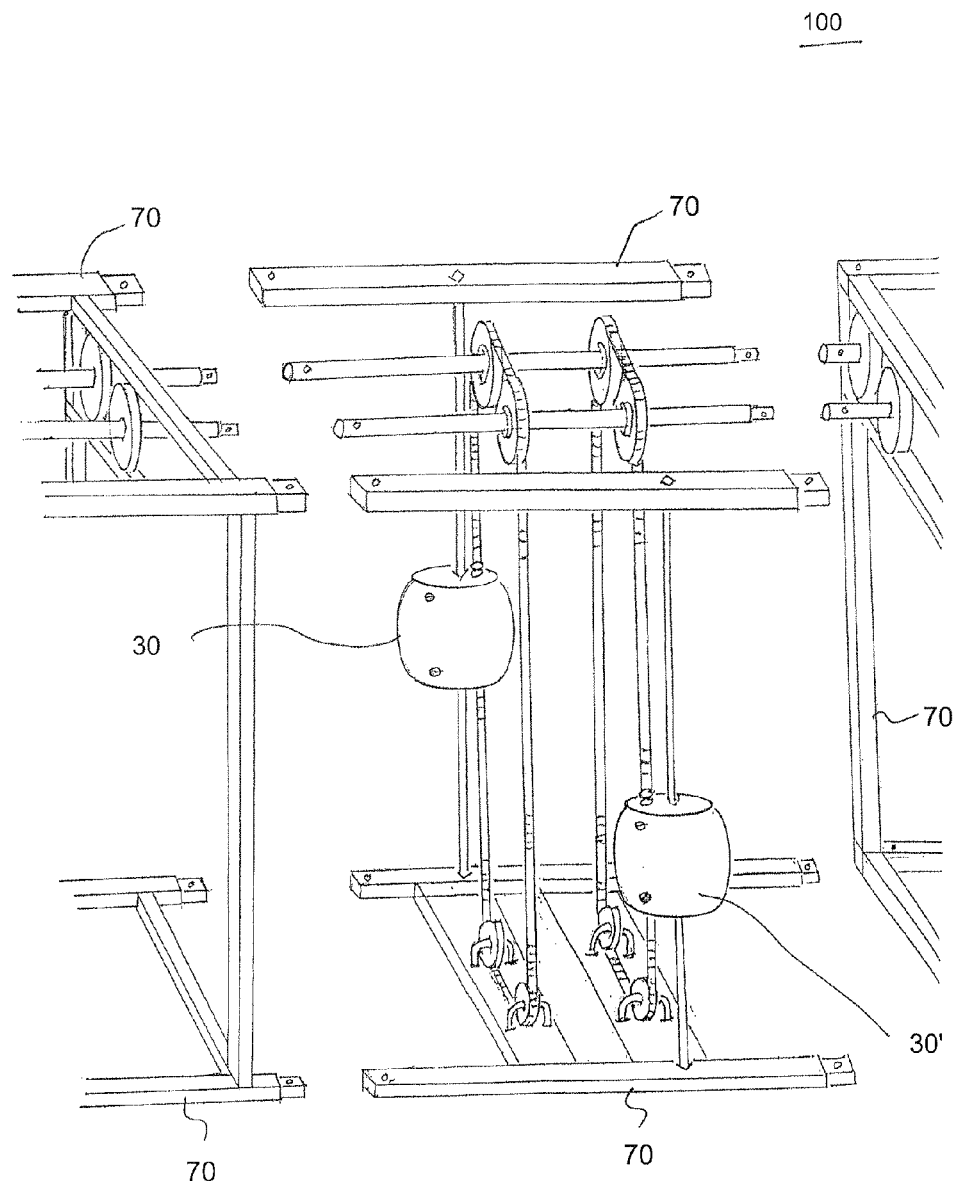
FIG. 2 is a perspective view showing a water wave power plant system according to another embodiment of the present invention.
Figure 3:
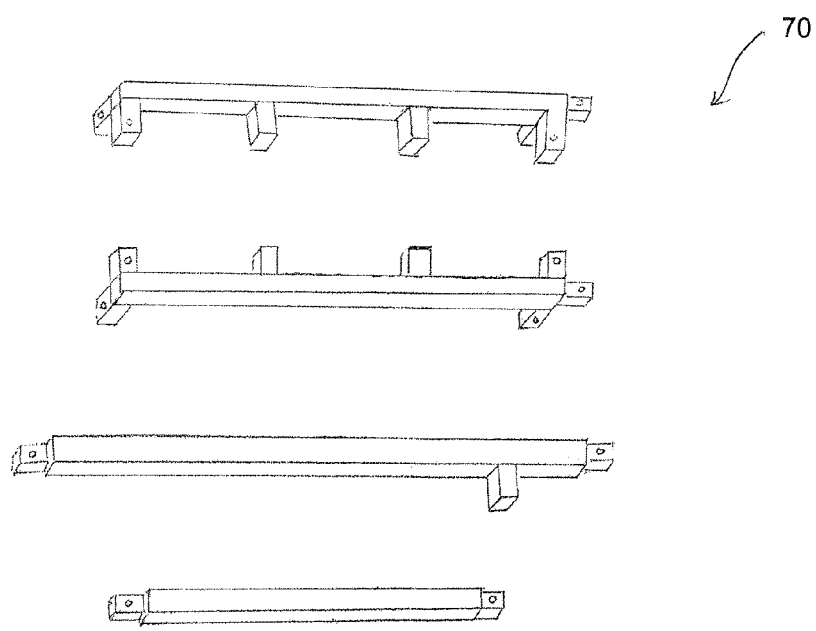
FIG. 3 is a perspective view showing parts of a supporting frame according to an embodiment of the invention.
Figure 4:
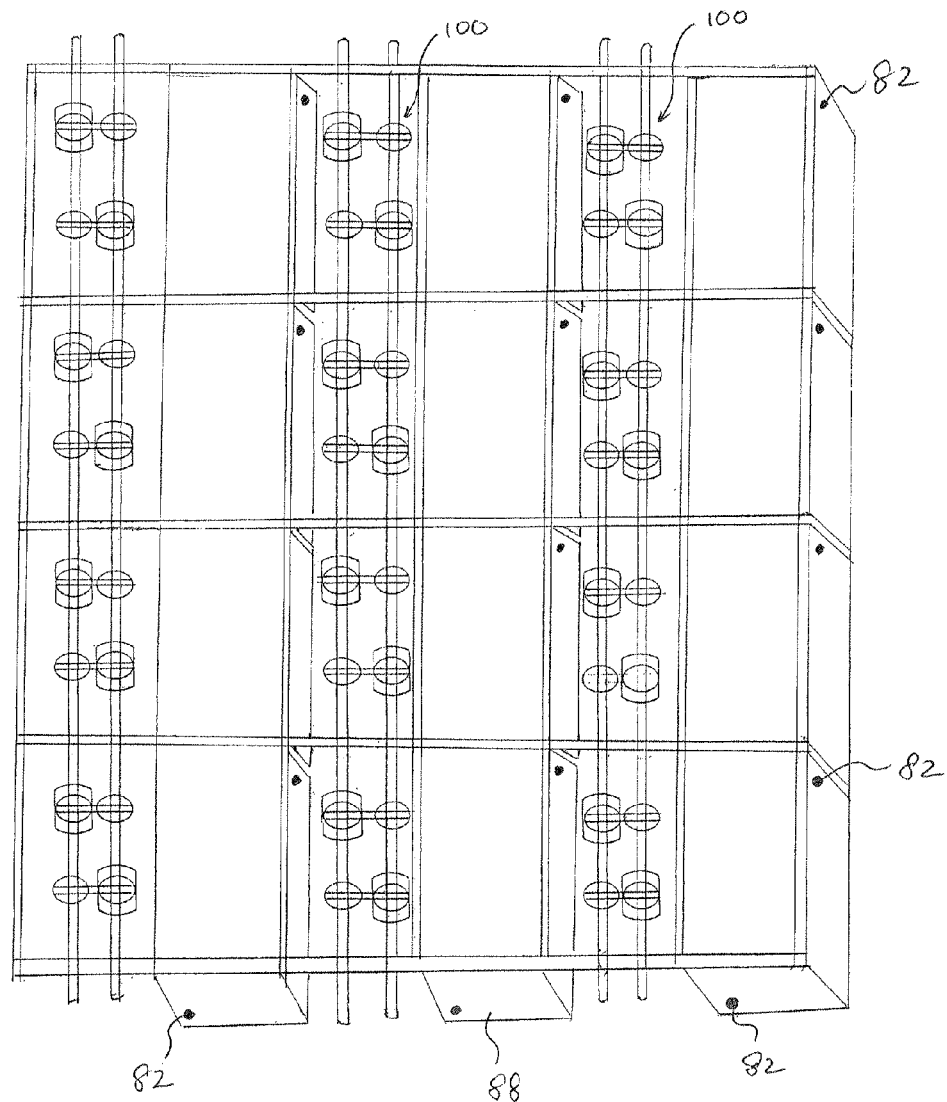
FIG. 4 is a perspective top view of a water wave power plant system installed on a floating platform.

FIGS. 1-3 show a water wave power plant system 100 according to an embodiment of the present invention. FIG. 4 shows a water wave power plant system 100 installed on a floating platform according to another embodiment of the invention.

An aspect of the invention provides the water wave power plant system 100.

The water wave power plant system 100 comprises:
a first guide rail 10 extending vertically;
a first clockwise freewheel 20 disposed at a top position;
a first counterclockwise freewheel 22 disposed at the top position and on a first plane same as the first clockwise freewheel 20;
a first buoy 30 having a through-hole 31, wherein the first buoy 30 is queued through the through-hole 31 by the first guide rail 10 and movement of the first buoy 30 is restricted to be along the first guide rail 10;
a first right roller 34 aligned vertically with the first clockwise freewheel 20 and disposed at a bottom position;
a first left roller 36 aligned vertically with the first counterclockwise freewheel 22 and disposed at the bottom position;
a first chain belt 40 having a first end connected to a top portion of the first buoy 30 and a second end connected to a bottom portion of the first buoy 30, wherein the first chain belt 40 engages the first clockwise freewheel 20, the first counterclockwise freewheel 22, the first right roller 34, and the first left roller 36 on the first plane;
a second guide rail 10' extending vertically;
a second clockwise freewheel 20' disposed at the top position;
a second counterclockwise freewheel 22' disposed at the top position and on a second plane same as the second clockwise freewheel 20';
a second buoy 30' having a through-hole 31', wherein the second buoy is queued through the through-hole 31' by the second guide rail 10' and movement of the second buoy 30' is restricted to be along the second guide rail 10';
a second right roller 34' aligned vertically with the second clockwise freewheel 20' and disposed at the bottom position;
a second left roller 36' aligned vertically with the second counterclockwise freewheel 22' and disposed at the bottom position;
a second chain belt 40' having a first end connected to a top portion of the second buoy 30' and a second end connected to a bottom portion of the second buoy 30', wherein the second chain belt 40' engages the second clockwise freewheel 20', the second counterclockwise freewheel 22', the second right roller 34', and the second left roller 36' on the second plane;
a clockwise shaft 50 engaging the first and second clockwise freewheels 20, 20';
a counterclockwise shaft 52 engaging the first and second counterclockwise freewheels 22, 22';
a first generator 60 engaging the clockwise shaft 50; and
a second generator 62' engaging the counterclockwise shaft 52.

The first buoy 30 and the second buoy 30' are disposed on the first chain belt 40 and the second chain belt 40' respectively, such that the first and the second buoys 30, 30' move oppositely from each other by a water wave.

Each of the first guide rail 10 and the second guide rail 10' may have a rectangular cross-section, and also the through-holes 31, 31' are rectangular, such that the corresponding buoy 30, 30' is guided along without rotating around the guide rail 10, 10'.

The clockwise freewheels 20, 20' may be configured to engage the corresponding clockwise shaft 50 for a clockwise rotation, and the counterclockwise freewheels 22, 22' may be configured to engage the corresponding counterclockwise shaft 52 for a counterclockwise rotation.

The clockwise freewheels 20, 20' may be configured to disengage the corresponding clockwise shaft 50 for a counterclockwise rotation, and the counterclockwise freewheels 22, 22' may be configured to disengage the corresponding counterclockwise shaft 52 for a clockwise rotation.

Each of the freewheels 20, 20', 22, 22' may comprise a ratchet device.

Each of the freewheels 20, 20', 22, 22' may comprise a plurality of spring-loaded steel rollers inside a driven cylinder.

Each of the first and second buoys 30, 30' may comprise a container provided in the buoys 30, 30' for keeping water of a predetermined amount inside.

The predetermined amount may be determined to make the buoy 30, 30' operate in a desired way.

The water wave power plant system may further comprise a stopcock 32, 32' for blocking an opening to the container.

Each of the first guide rail 10 and the second guide rail 10' may have an angular cross-section, such that the corresponding buoy 30, 30' is guided along without rotating around the guide rail 10, 10'.

The angular cross-section may comprise a triangle, a pentagon, a hexagon, and a quadrangle. Therefore, in certain embodiments of the invention, the guide rail 10, 10' may be a flat band of metal.

The water wave power plant system 100 may further comprise a supporting frame 70 for anchoring the guide rails 10, 10', the shafts 50, 52, and the right and left rollers 34, 34', 36, 36'.

The water wave power plant system 100 may further comprise a plurality of bearings 90 for allowing the shafts 50, 52 rotate freely while constrained against the supporting frame 70.

The water wave power plant system 100 may further comprise a platform 80 fixed to a floor of ocean for installing the supporting frame 70.

The water wave power plant system 100 may further comprise a floating platform 88 for installing the supporting frame 70 as shown in FIG. 4.

The floating platform 88 may comprise a barge, which comprises a water container (inside the floating platform 88) with a stopcock 82. Like the buoy 30, 30', the water container of the barge 88 can be loaded with water to optimize the condition for the operation of the system 100.

In certain embodiments of the invention, the system 100 may include more buoys and associated other elements for expanding the structure to tap more of the wave energy as shown in FIG. 2.

FIG. 2 is a perspective view showing a water wave power plant system according to another embodiment of the present invention. In certain embodiment of the invention, the structure in FIG. 1 can by combined with the structure in FIG. 2, building a bigger structure.

FIG. 3 is a perspective view showing parts of a supporting frame according to an embodiment of the invention. However, the frame 70 may be constructed with other materials, for example, such as cylindrical poles.

FIG. 4 is a perspective top view of a water wave power plant system installed on a floating platform. In certain embodiments of the invention, a plurality of the water wave power plant system 100 may be installed on a big barge structure. Then, the buoys 30, 30' move up and down relative to the relatively heavy and stationary barge structure.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A water wave power plant system comprising:
a first guide rail extending vertically;
a first clockwise freewheel disposed at a top position;
a first counterclockwise freewheel disposed at the top position and on a first plane same as the first clockwise freewheel;
a first buoy having a through-hole, wherein the first buoy is queued through the through-hole by the first guide rail and movement of the first buoy is restricted to be along the first guide rail;
a first right roller aligned vertically with the first clockwise freewheel and disposed at a bottom position;
a first left roller aligned vertically with the first counterclockwise freewheel and disposed at the bottom position;
a first chain belt having a first end connected to a top portion of the first buoy and a second end connected to a bottom portion of the first buoy, wherein the first chain belt engages the first clockwise freewheel, the first counterclockwise freewheel, the first right roller, and the first left roller on the first plane;
a second guide rail extending vertically;
a second clockwise freewheel disposed at the top position;
a second counterclockwise freewheel disposed at the top position and on a second plane same as the second clockwise freewheel;
a second buoy having a through-hole, wherein the second buoy is queued through the through-hole by the second guide rail and movement of the second buoy is restricted to be along the second guide rail;
a second right roller aligned vertically with the second clockwise freewheel and disposed at the bottom position;
a second left roller aligned vertically with the second counterclockwise freewheel and disposed at the bottom position;
a second chain belt having a first end connected to a top portion of the second buoy and a second end connected to a bottom portion of the second buoy, wherein the second chain belt engages the second clockwise freewheel, the second counterclockwise freewheel, the second right roller, and the second left roller on the second plane;
a clockwise shaft engaging the first and second clockwise freewheels;
a counterclockwise shaft engaging the first and second counterclockwise freewheels;
a first generator engaging the clockwise shaft; and
a second generator engaging the counterclockwise shaft,
wherein the first buoy and the second buoy are disposed on the first chain belt and the second chain belt, such that the first and the second buoy move oppositely from each other by a water wave.

2. The water wave power plant system of claim 1, wherein each of the first guide rail and the second guide rail has a rectangular cross-section and the through-hole is rectangular, such that the corresponding buoy is guided along without rotating around the guide rail.

3. The water wave power plant system of claim 1, wherein the clockwise freewheels are configured to engage the corresponding clockwise shaft for a clockwise rotation, and wherein the counterclockwise freewheels are configured to engage the corresponding counterclockwise shaft for a counterclockwise rotation.

4. The water wave power plant system of claim 3, wherein the clockwise freewheels are configured to disengage the corresponding clockwise shaft for a counterclockwise rotation, and wherein the counterclockwise freewheels are configured to disengage the corresponding counterclockwise shaft for a clockwise rotation.

5. The water wave power plant system of claim 1, wherein each of the freewheels comprises a ratchet device.

6. The water wave power plant system of claim 1, wherein each of the freewheels comprises a plurality of spring-loaded steel rollers inside a driven cylinder.

7. The water wave power plant system of claim 1, wherein each of the first and second buoys comprises a container for keeping water of a predetermined amount inside.

8. The water wave power plant system of claim 7, wherein the predetermined amount is determined to make the buoy operate in a desired way.

9. The water wave power plant system of claim 7, further comprising a stopcock for blocking an opening to the container.

10. The water wave power plant system of claim 1, wherein each of the first guide rail and the second guide rail has an angular cross-section, such that the corresponding buoy is guided along without rotating around the guide rail.

11. The water wave power plant system of claim 10, wherein the angular cross-section comprises a triangle, a pentagon, a hexagon, and a quadrangle.

12. The water wave power plant system of claim 1, further comprising a supporting frame for anchoring the guide rails, the shafts, and the right and left rollers.

13. The water wave power plant system of claim 12, further comprising a plurality of bearings for allowing the shafts rotate freely while constrained against the supporting frame.

14. The water wave power plant system of claim 12, further comprising a platform fixed to a floor of ocean for installing the supporting frame.

15. The water wave power plant system of claim 12, further comprising a floating platform for installing the supporting frame.

16. The water wave power plant system of claim 15, wherein the floating platform comprises a barge, and wherein the barge comprises a water container with a stopcock.

17. The water wave power plant system of claim 1, further comprising:
- a third guide rail extending vertically;
- a third clockwise freewheel disposed at a top position;
- a third counterclockwise freewheel disposed at the top position and on a third plane same as the third clockwise freewheel;
- a third buoy having a through-hole, wherein the third buoy is queued through the through-hole by the third guide rail and movement of the third buoy is restricted to be along the third guide rail;
- a third right roller aligned vertically with the third clockwise freewheel and disposed at a bottom position;
- a third left roller aligned vertically with the third counterclockwise freewheel and disposed at the bottom position; and
- a third chain belt having a third end connected to a top portion of the third buoy and a second end connected to a bottom portion of the third buoy, wherein the third chain belt engages the third clockwise freewheel, the third counterclockwise freewheel, the third right roller, and the third left roller on the third plane.

* * * * *